United States Patent [19]

MacDonald et al.

[11] 4,374,206
[45] Feb. 15, 1983

[54] SYNTHESIS OF BASE-STABLE ALIPHATIC ANION EXCHANGE POLYMERS

[75] Inventors: Russel J. MacDonald, Wilmington; Russell B. Hodgdon, Sudbury, both of Mass.

[73] Assignee: Ionics Incorporated, Watertown, Mass.

[21] Appl. No.: 237,018

[22] Filed: Feb. 23, 1981

[51] Int. Cl.³ .................. C08F 20/36; B01J 39/20; B01J 14/44
[52] U.S. Cl. .................................... 521/38; 526/323.2
[58] Field of Search ........................... 526/323.2, 310; 204/252; 521/38

[56] References Cited

U.S. PATENT DOCUMENTS 2,636,851  4/1953  Juda et al. ..................... 204/252
4,060,678  11/1977 Steckler ......................... 526/310
4,163,092  7/1979  Steckler ......................... 526/310

Primary Examiner—William F. Hamrock
Assistant Examiner—Peter F. Kulkosky
Attorney, Agent, or Firm—Norman E. Saliba

[57] ABSTRACT

Base stable aliphatic anion exchangers are produced by reacting a water soluble methacrylate ester quaternary amine monomer with a non-water soluble glycol dimethacrylate ester cross-linking monomer.

11 Claims, No Drawings

SYNTHESIS OF BASE-STABLE ALIPHATIC ANION EXCHANGE POLYMERS

FIELD OF THE INVENTION

This invention is directed to novel highly cross-linked, aliphatic, quaternary ammonium anion exchange polymers and to their synthesis. In particular it is directed to the use of the polymer in the manufacture of membranes for use in electrodialysis operations where high pH solutions are involved.

DESCRIPTION OF THE PRIOR ART

In U.S. Pat. No. 4,231,885 (Hodgdon, et al) which is incorporated herein by reference, there is disclosed a process for synthesizing aliphatic quaternary ammonium ion-exchange polymers which have reasonable stability in basic solutions. Such a method involves the polymerization of nonionic monomer containing tertiary amine groups such as dimethylamino ethyl methacrylate (DMAEMA) with a non-ionic polyunsaturated cross-linking monomer containing vinyl groups, such as ethylene glycol dimethacrylate (EGDM) in an appropriate solvent. The resulting non-ionic polymer must then be made ionic by reacting with a reagent such as methyl chloride (CH₃Cl) to convert the tertiary amine groups to the quaternary ammonium groups. The post alkylation or methylation step is not only a costly procedure but the polymer is seldom completely reacted (methylated) resulting in a polymeric resin having less than the desired ion-exchange capacity.

SUMMARY OF THE INVENTION

The present invention comprises an improvement over the methods of the prior art by first providing a water soluble ionic monomer and copolymerizing the same with a non-ionic, non-water soluble cross-linking monomer such as a polyunsaturated methacrylate ester preferably containing at least two vinyl groups. These include the glycol dimethacrylates such as ethylene glycol dimethacrylate (EGDM), neopentyl glycol dimethacrylate, polyethylene glycol dimethacrylate, trimethylol propane trimethacrylate, bis-phenol A dimethacrylate, pentaerythritol, tri and tetramethacrylate, etc, The preferred water soluble monomer is prepared by reacting the non-water soluble monomer glycidyl methacrylate (GMA) with an acid salt of tertiary amine such as trimethylamine-hydrochloride (TMA·HCl) in a solvent such as ethyl alcohol. The reaction is heterogeneous (non-homogeneous) in that the solid trimethylamine- HCl which is suspended in alcohol reacts with the dissolved GMA to form a solid monomeric suspension of a quaternary amine product as follows:

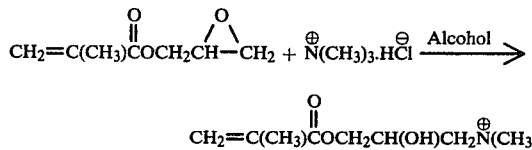

Since the resulting product is not soluble in alcohol but soluble in water, sufficient water is then added to the alcohol-solid mixture to dissolve the solid monomer. To the homogeneous mixture is than slowly added a cross-linking monomer such as EGDM along with an azo polymerization initiator such as V-50 ®. The mixture is then polymerized into a solid polymeric resin by heating in an oven which results in the following reaction taking place:

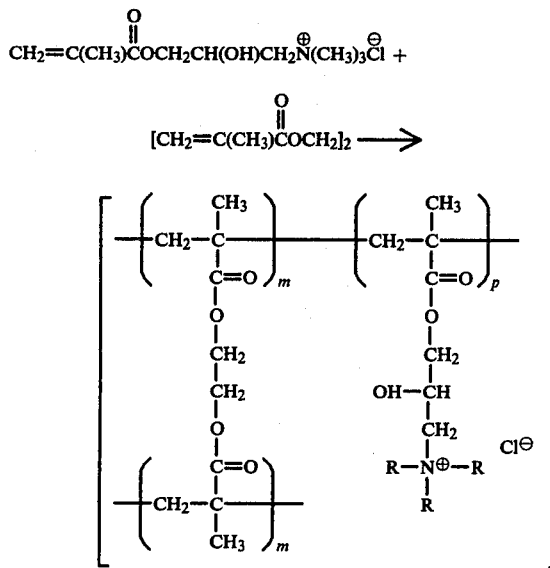

Suitable acid salts of tertiary amines for use in the present invention include those in which the tertiary amine portion of the salt contain alkyl groups of from 1 to 10 carbons such as trimethylamine, triethylamine etc. and mixed trialkylamines all of which are water soluble. The acid portion of the salt include acids such as sulfuric, carboxylic, nitric, halogens etc. that will impart to the ion-exchange polymer univalent anions such as $Cl^-$, $Br^-$, $I^-$, $HSO_4^-$, $RCOO^-$, $NO_3^-$, $(SO_4^=)_{\frac{1}{2}}$, and the like.

Although glycidyl methacrylate is the preferred methacrylic ester monomer other unsaturated monomers may be used as represented by the following formula:

where n represents the number 1 to 10.

GMA is a clear, colorless, functional methacrylate ester monomer containing a vinyl grouping and is soluble in most organic solvents such as alcohol but not in water. The invention broadly contemplates the use of glycidyl esters of acrylic, methacrylic and crotinic acids although the methacrylic ester GMA, is preferred.

The polymer may be synthesized using a wide ratio range of water soluble monomer to the water insoluble cross-linking monomer but for the purpose of manufacturing anion-exchange membranes, it is preferred that the cross-linking monomer comprise about 30% to 50% by weight of the resulting polymer.

The invention further comprises the use of the water soluble, quaternary amine monomer in conjunction with a cross-linking monomer in the manufacture of anion exchange material in sheet or membrane from for use in electrodialysis apparatus employed in the process of changing the ionic content of liquids. In the process of manufacturing anion exchange polymers, the water soluble monomer containing for example quaternary ammonium chloride groups and a polymerization initiator is mixed with a cross linking monomer and heated until polymerized into a solid anion polymer. The resulting polymer will now contain pendant quaternary ammonium groups provided by the water soluble monomer.

A suitable class of free-radical generating compounds which can be used as catalysts for polymerization are both the peroxides and the azo catalysts. The azo catalyst include for example 2, 2-azobis (2-amidinopropane) hydrochloride, known under the trade name V-50, azobibisobutyronitrile, azobisisobutyramide, azobis ($\alpha,\alpha$-dimethyvaleronitrile), azobis ($\alpha$ methyl-butyronitrile), dimethyl, diethyl, or dibutyl azobis (methyl-valerate). The peroxide catalyst include benzoyl peroxide, hydrogen peroxide, potassium persulfate and the like. These compounds, which serve as free radical ititiators, contain an —N=N— group (azo) or —O—O— group (peroxide) attached to aliphatic carbon atoms, at least one of which is tertiary. An amount of 0.01% to 2% of the weight of monomer or monomers is usually sufficient.

The polymerization reaction may be carried out in the temperature range of about 40° C. to 100° C. but the preferred range is between about 60° C. to 80° C.

The preferred procedure for preparing the monomer and copolymers of this invention is further illustrated by the following examples:

EXAMPLE 1

124 gms. of water soluble trimethylamine-hydrochloride was added to a solution comprised of 173 ml of the non-water soluble monomer glycidyl methacrylate dissolved in 250 ml of ethyl alcohol. On the addition of the amine compound the mixture became heterogeneous and was accompanied by an exothermic reaction which reached a miximum temperature of 60° C. To the resulting non-homogeneous reaction mixture was added 7.2 gms. of the water soluble polymerization initiator V-50 ® (obtained from Crescent Chemical Co., Inc. Hauppauge, NY) which was first dissolved in 100 ml. of distilled water. To the resulting clear homogeneous solution was added 132 ml. of the cross-linking agent ethylene glycol dimethacrylate (EGDM).

The resulting homogeneous solution was then poured into an 11"×13"×2" deep rectangular tray into which was laid in alternating fashion, glass plates and 20 mil thick modacrylic cloth until the top of the monomer liquid level was reached. The entire tray was put into an even at 80° C. and heated overnight. At the end of this period, the monomer mix had turned to a solid mass. The excess resin was chipped from the pan and the glass plates were carefully removed to yield cloth sheets, 20 mils in thickness surrounded and impregrated with the polymerized resin. The resulting membranes gave the following properties:

Mullen Burst = 140 psi
Thickness = 0.054
Resistivity = 8.6 ohm-cm$^2$ (0.0 1 N NaCl) (1000 Hz)
Water Content = 44.9%
Capacity = 2.37 Milliequivalents Cl$^\ominus$ per gram of dry resin

EXAMPLE 2

212 gms. of water soluble triethylamine-hydrochloride was added to a solution comprised of 173 ml of the non-water soluble monomer glycidyl methacrylate dissolved in 250 ml of ethyl alcohol. On the addition of the amine compound the mixture became heterogeneous and was accompanied by an exothermic reaction which reached a maximum temperature of 60° C. To the resulting non-homogeneous reaction mixture was added 7.2 gms. of the polymerization initiator V-50 ® (obtained from Crescent Chemical Co., Inc., Hauppauge, NY) which was first dissolved in 100 ml. of distilled water. To the resulting clear homogeneous solution was added 150 ml of the cross-linking agent trimethylolpropane trimethacrylate (TMPTM).

The resulting homogeneous solution was then manufactured into membrane sheets in the manner described in Example 1 and the resulting membranes gave the following properties:

Mullen Burst = 140 psi
Thickness = 0.054
Resistivity = 8.9 ohm-cm$^2$ (0.0 1 N NaCl) (1000 Hz)
Water Content = 43.2%
Capacity = 2.24 Milliequivalents Cl$^\ominus$ per gram of dry resin The membranes of both Examples 1 and 2 when placed in a 0.1 N NaOH solution (pH 13) for a three month period, remained stable whereas the aliphatic quaternary ammonium ion-exchange membranes produced by the methods of the prior art (U.S. Pat. No. 4,231,855) showed deterioration within a two week period.

As many apparently widely different embodiments of this invention may be made without departing from the spirit and scope thereof, it is to be understood that the invention is not limited to the specific embodiments thereof except as defined in the appended claims.

The embodiments of this invention in which an exclusive property or privilege is claimed are defined as follows:

1. A process for preparing a cross-linked quaternary amine anion exchange polymer comprising (a) reacting an alcoholic solution of glycidyl methacrylate with a solid tertiary amine-acid salt to yield a non-homogeneous alcohol mixture of an quaternary amine monomer (b) adding sufficient water to said non-homogeneous mixture until said mixture becomes homogeneous (c) adding a cross-linking polyol methacrylate ester monomer to the mixture to form a homogeneous liquid mixture of said ionic and cross-linking monomers and thereafter polymerizing said monomeric mixture by heating in the presence of a polymerization catalyst.

2. An ion-exchange polymer made by the process in claim 1.

3. The polymer of claim 2 made as a sheet to form an anion-exchange membrane.

4. The process of claim 1 wherein the tertiary amine portion of the tertiary amine-acid salt is a trialkyl amine having alkyl groups of from 1 to 10 carbon atoms.

5. The process of claim 4 wherein the acid portion of said tertiary amine-acid salt is selected from the group consisting of sulfuric, carboxylic, nitric and halides.

6. An electrochemical cell comprising chambers adapted to contain liquids defined by ion permeable membranes and having terminal electrodes for passing a direct current transversely through said chambers and membranes, the improvement wherein at least some of said membranes are comprised of the anion-selective type made by the process of claim 1.

7. An ion exchange, cross-linked, polymeric structure consisting of a plurality of recurring units of the formula:

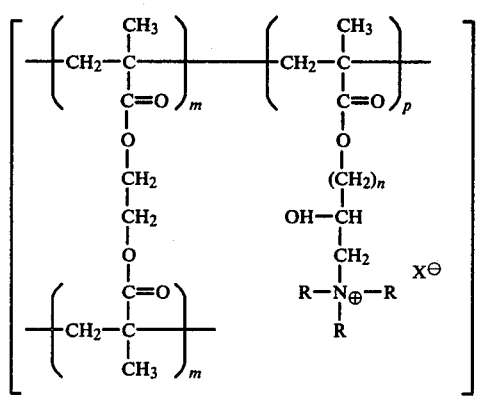

where R represents an alkyl group of $C_1$ to $C_{10}$, X represents a univalent anion of an acid and n represents the number 1 to 10.

8. The structure of claim 7 wherein X represents a univalent anion of of $Cl^-$, $Br^-$, $I^-$, $HSO_4^-$, $NO_3^-$, $(SO_4^=)_{\frac{1}{2}}$ and $RCOO^-$.

9. The structure of claim 7 wherein the mole fraction of p is between 0.3 to 0.7.

10. An electrochamical cell comprising chambers adapted to contain liquids defined by ion permeable membranes and having terminal electrodes for passing a direct current transversely through said chambers and membranes, the improvement wherein at least some said membranes are comprised of the anion-selective type of claim 7.

11. The process of claim 1 wherein the cross-linking polyol methacrylate ester monomer is ethylene glycol dimethecrylate.

* * * * *